United States Patent
Bongiovanni et al.

(10) Patent No.: US 10,660,271 B2
(45) Date of Patent: May 26, 2020

(54) AGRICULTURAL MACHINE FOR HARVESTING A CROP, COMPRISING A HARVESTING HEAD AND A CROP TRANSPORTATION SYSTEM FOR SAID HARVESTING HEAD, AND RELATED TRANSPORTATION SYSTEM

(71) Applicant: STW S.R.L., Cuneo (IT)

(72) Inventors: Livio Bongiovanni, Cuneo (IT); Lodovico Armando, Cervasca (IT)

(73) Assignee: STW S.R.L., Cuneo (IT)

( * ) Notice: Subject to any disclaimer, the term of this patent is extended or adjusted under 35 U.S.C. 154(b) by 199 days.

(21) Appl. No.: 15/750,062

(22) PCT Filed: Aug. 3, 2016

(86) PCT No.: PCT/IB2016/054684
§ 371 (c)(1),
(2) Date: Feb. 2, 2018

(87) PCT Pub. No.: WO2017/021907
PCT Pub. Date: Feb. 9, 2017

(65) Prior Publication Data
US 2018/0228087 A1    Aug. 16, 2018

(30) Foreign Application Priority Data

Aug. 6, 2015    (IT) ......................... 102015000042950

(51) Int. Cl.
*A01D 61/00* (2006.01)
*A01D 57/00* (2006.01)
(Continued)

(52) U.S. Cl.
CPC ........... *A01D 61/002* (2013.01); *A01D 57/00* (2013.01); *A01D 34/04* (2013.01); *A01D 34/14* (2013.01)

(58) Field of Classification Search
CPC ...... A01D 61/002; A01D 57/00; A01D 34/04; A01D 34/14
See application file for complete search history.

(56) References Cited

U.S. PATENT DOCUMENTS

| 1,487,882 A | 3/1924 | Parker |
| 1,737,853 A | 12/1929 | Kraemer |

(Continued)

FOREIGN PATENT DOCUMENTS

| CN | 106856813 A | * | 6/2017 | ............. A01D 34/04 |
| DE | 102005005614 A1 | * | 8/2006 | ........... A01D 43/083 |

(Continued)

OTHER PUBLICATIONS

International Preliminary Report on Patentability dated Feb. 6, 2018, issued in PCT Application No. PCT/IB2016/054684, filed Aug. 3, 2016.

(Continued)

*Primary Examiner* — Arpad Fabian-Kovacs
(74) *Attorney, Agent, or Firm* — Workman Nydegger (57) ABSTRACT

An agricultural machine for harvesting a crop, which is equipped with a harvesting head, includes: a mowing bar for harvesting the crop; at least one transportation system adapted to transport the crop cut by the mowing bar to a collection mouth of the harvesting head. The at least one transportation system includes: a first transmission system having a first flexible element coupled with a pair of first rotary elements; a second transmission system having a second flexible element coupled with a pair of second rotary elements; at least one arm coupled with both of the first flexible element and the second flexible element, in such a way as to extend on the harvesting head substantially transversally relative to the mowing bar both during a (Continued)

transportation step for transporting the crop cut by the mowing bar and during a return step.

17 Claims, 4 Drawing Sheets

(51) Int. Cl.
*A01D 34/04* (2006.01)
*A01D 34/14* (2006.01)

(56) References Cited

U.S. PATENT DOCUMENTS

| | | | |
|---|---|---|---|
| 3,921,785 A | 11/1975 | Huitink | |
| 4,182,098 A * | 1/1980 | Kass | A01D 34/83 56/14.5 |
| 4,266,394 A * | 5/1981 | VanGinhoven | A01D 57/22 56/119 |
| 4,771,592 A * | 9/1988 | Krone | A01D 43/082 56/119 |
| 5,000,306 A | 3/1991 | Zitz et al. | |
| 5,040,362 A * | 8/1991 | Morgan | A01D 57/22 56/308 |
| 6,668,532 B2 * | 12/2003 | Krone | A01D 43/082 56/93 |
| 6,837,034 B1 * | 1/2005 | Krone | A01D 65/00 56/14.3 |
| 6,925,790 B1 * | 8/2005 | Krone | A01B 73/044 56/51 |
| 7,121,070 B2 * | 10/2006 | Krone | A01D 43/082 56/62 |
| 9,775,292 B2 * | 10/2017 | Horning | A01D 45/021 |
| 2005/0132688 A1 * | 6/2005 | Resing | A01D 43/082 56/51 |
| 2006/0254240 A1 * | 11/2006 | Krone | A01D 41/144 56/16.6 |
| 2016/0330904 A1 * | 11/2016 | Weitenberg | A01D 43/081 |
| 2019/0008093 A1 * | 1/2019 | Kamphorst | A01D 61/002 |

FOREIGN PATENT DOCUMENTS

| | | | | |
|---|---|---|---|---|
| EP | 1008291 A1 * | 6/2000 | | A01D 43/082 |
| WO | 2009/136266 A1 | 11/2009 | | |

OTHER PUBLICATIONS

International Search Report dated Oct. 31, 2016, issued in PCT Application No. PCT/IB2016/054684, filed Aug. 3, 2016.

* cited by examiner

AGRICULTURAL MACHINE FOR HARVESTING A CROP, COMPRISING A HARVESTING HEAD AND A CROP TRANSPORTATION SYSTEM FOR SAID HARVESTING HEAD, AND RELATED TRANSPORTATION SYSTEM

BACKGROUND OF THE INVENTION

1. The Field of the Invention

The present invention relates to an agricultural machine for harvesting a crop, said agricultural machine comprising a harvesting head and a crop transportation system for said harvesting head.

2. The Relevant Technology

The present invention also relates to an associated crop transportation system for a harvesting head of an agricultural machine.

Agricultural machines are known in the art which can harvest various types of crops, such as, for example, cereals and dry legumina; in this case, one such agricultural machine is known as "harvester".

Agricultural machines are also known in the art which can carry out a process for separating the seeds or fruits from respective plants, e.g., wheat or rice, in which cases cereals are shelled and separated from the straw; in this case, one such agricultural machine is known as "threshing machine".

Usually the agricultural machines known in the art can both harvest and thresh various types of crops, and are known as "combine harvesters".

Therefore, in the present description reference will generally be made to an agricultural machine for harvesting a crop, regardless of whether it is a harvester or a combine harvester.

The agricultural machines known in the art include a harvesting head equipped with at least one mowing bar for harvesting (i.e., cutting or separating) the crop.

Several types of harvesting heads are known in the art, which are typically interchangeable; in particular, there are generic harvesting heads (suitable for wheat, barley, soy bean, triticale, rape, broad bean and other thin-stalk cultivations), which harvest the crop by cutting the stalk and conveying almost the entire plant into the machine; "husking" harvesting heads (e.g., for maize), which preferentially detach the spikes or cobs only, leaving the stalk of the plant on the ground; harvesting heads for particular crops (e.g., sunflower, the stalk of which is strong and thick), and so on.

It must be pointed out that the agricultural machine may be equipped with a reel associated with said harvesting head, said reel being preferably of the raisable type; in such an embodiment, the function of the reel usually is to accompany, lift from the ground and convey the product during the harvest towards the mowing bar of the harvesting head.

In addition, the harvesting heads known in the art typically comprise a transportation system adapted to transport the crop from the mowing bar towards a collection mouth of the harvesting head. Usually said collection mouth is associated with the inner part of the machine and is located in a substantially central position of the harvesting head; if the agricultural machine is a combine harvester, said collection portion is also associated with a threshing system located in the inner part of the machine.

According to a first known embodiment, said transportation system is so realized as to comprise a screw mounted perpendicular to the direction of travel on the harvesting head, said screw allowing the crop cut by the mowing bar to be conveyed towards said collection mouth. The peculiarity of the screws of the transportation systems known in the art lies in the fact that, with reference to the centre of the harvesting head or cutting platform, the right-hand side has a spiral oriented in the direction opposite to the one on the left-hand side; in this manner, the crop or product can be moved towards the centre by means of a single rotary motion. It should be noted that said screw may be fitted with teeth located in proximity to the collection mouth, which are useful for pushing the crop (or biomass) into said collection mouth; in particular, said teeth may be retractable and may consist of a set of metal rods hinged to a shaft, which is preferably arranged in an offset position within the screw. During the rotation, the retractable teeth will exit on the front side and will retract into the screw on the rear side, thus avoiding any crop accumulation.

However, the transportation system according to the above-described embodiment suffers from a number of drawbacks, since it will tend to damage the crop interposed between the screw spirals and the mowing bar of the harvesting head; it is clear that any such damages to the crop, or even only to a part thereof, is not acceptable and calls for different, more effective solutions.

Furthermore, a transportation system that includes a screw is not very effective in harvesting the crop, in particular because of the great distance between the mowing bar and the screw; it should be noted that this technical problem is also at the basis of document U.S. Pat. No. 5,148,658A, which teaches to associate suitable teeth with the cutting blades of the mowing bar, for the very purpose of reducing the distance between said mowing bar and the screw and promoting contact between the crop and the screw.

Document No. U.S. Pat. No. 3,921,785 describes a different type of transportation system for an agricultural machine, in that said transportation system comprises a plurality of arms extending on the harvesting head transversally relative to the mowing bar, for the purpose of dragging and transporting the crop from said mowing bar towards the collection mouth, each arm being coupled with a single chain that allows it to move on the harvesting head. In particular, the transportation system described in document No. U.S. Pat. No. 3,921,785 comprises one transportation system on each side of the harvesting head or cutting platform.

However, also the transportation system described in document No. U.S. Pat. No. 3,921,785 has some drawbacks, in that it causes shaking, overflowing or twisting of the crop as each arm is inserted into or removed from the harvesting head or cutting platform. In particular, it has been observed that crop twisting is especially frequent when each arm arrives near each one of the two crown wheels associated with the chain, since in that section each arm makes a rotary movement relative to the direction followed by said arm (transversal to the cutting platform) in order to transport the crop cut by the mowing bar on the harvesting head; it is therefore apparent that said rotary movement of each arm implies undesired twisting of the crop, leading to poor crop transportation efficiency.

A further drawback of the transportation system described in document No. U.S. Pat. No. 3,921,785 is that it is too tall. In fact, each arm of said plurality of arms of the transportation system covers:

an "active" or "ride" section, along which each arm transports the crop and each arm is positioned substantially horizontally, i.e., substantially parallel to a bottom base of the cutting platform;

a "passive" or "return" section, along which each arm follows a path in the direction opposite to that along which it transports the crop, and each arm is positioned substantially vertically, i.e., substantially parallel to a rear wall of the cutting platform and substantially perpendicular to the bottom base of the cutting platform.

It is clear that such excessive height leads to considerable problems, since such dimensions will not allow the harvesting head to fold easily, which is particularly necessary when the harvesting bar is quite wide and needs to be transported on the road.

In this frame, it is the main object of the present invention to provide an agricultural machine for harvesting a crop, which comprises a harvesting head and a crop transportation system for said harvesting head, and a related transportation system for a harvesting head of an agricultural machine, which are so realized as to overcome the drawbacks of the prior art.

In particular, it is one object of the present invention to provide an agricultural machine and an associated crop transportation system for a harvesting head of the agricultural machine, wherein said transportation system is so realized as to transport and collect the crop effectively and quickly, such transportation and collection being carried out without damaging said crop.

It is another object of the present invention to provide an agricultural machine and an associated crop transportation system for a harvesting head of the agricultural machine, wherein said transportation system is so conceived that the crop will not be subject to shaking, overflowing or twisting as it is transported on the harvesting head of the agricultural machine.

It is a further object of the present invention to provide an agricultural machine and an associated crop transportation system for a harvesting head of the agricultural machine, wherein said transportation system is so realized as to have minimal height dimensions and to allow the harvesting head to be easily folded, in particular whenever said harvester needs to be transported on the road.

Said objects are achieved by the present invention through an agricultural machine for harvesting a crop that comprises a harvesting head and a crop transportation system for said harvesting head and an associated transportation system for a harvesting head of an agricultural machine incorporating the features set out in the appended claims, which are an integral part of the present description.

BRIEF DESCRIPTION OF THE DRAWINGS

Further objects, features and advantages of the present invention will become apparent from the following detailed description and from the annexed drawings, which are supplied by way of non-limiting explanatory example, wherein.

DETAILED DESCRIPTION OF THE PREFERRED EMBODIMENTS

Figure 1:
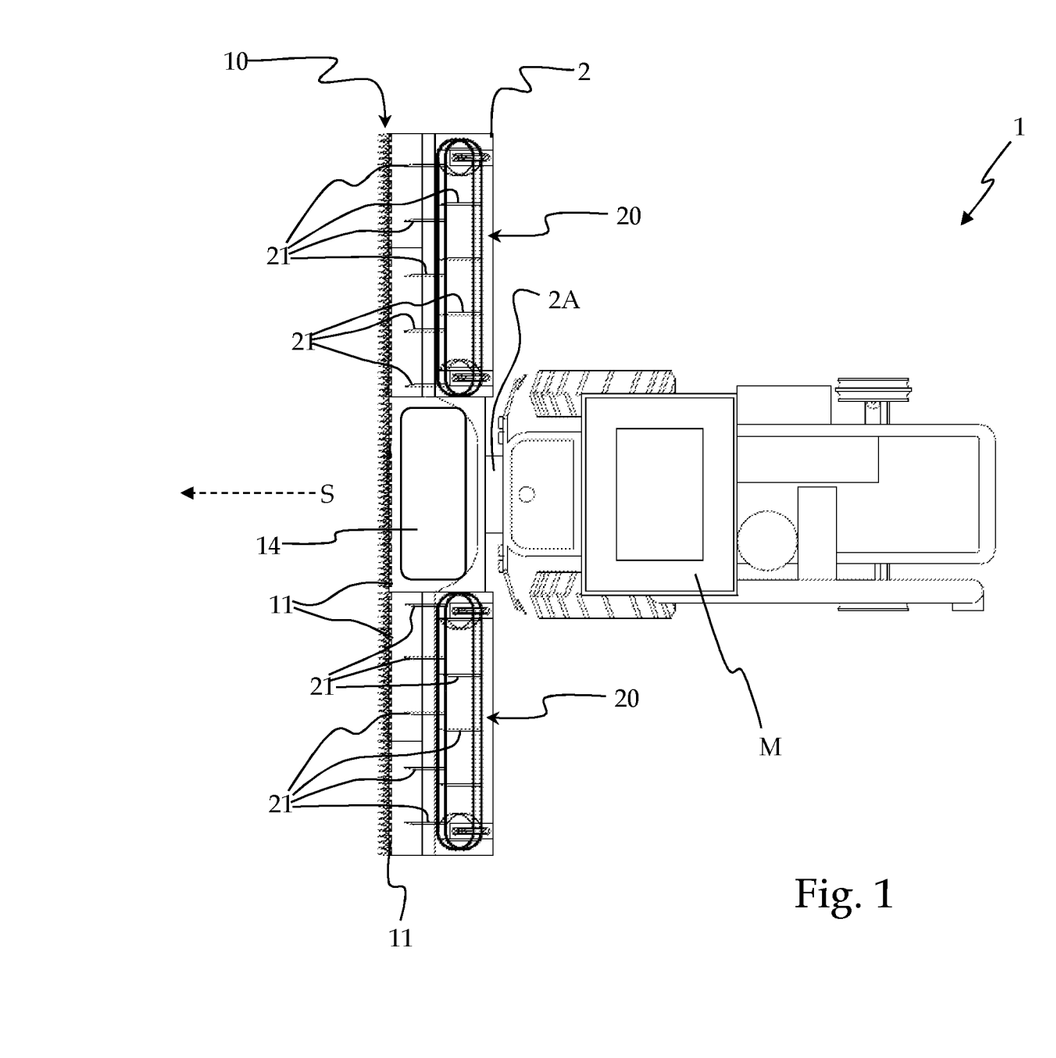
FIG. 1 is a top view of an agricultural machine for harvesting a crop according to the present invention.

With reference to the annexed drawings, in FIG. 1 reference numeral 1 designates as a whole an agricultural machine according to the present invention.

In a preferred embodiment, the agricultural machine 1 is a combine harvester; it is however clear that the agricultural machine 1 according to the present invention may also be a simple harvester or an agricultural machine of a different type. Therefore, it must be pointed out that reference will be made in the present description to a generic agricultural machine 1 for harvesting a crop, regardless of whether it is a harvester or a combine harvester or an agricultural machine of a different type.

Said crop is not shown in the annexed drawings, but it may be a cereal, dry legumina, etc.

The agricultural machine 1 is equipped with a harvesting head 2, which may also be called "cutting platform"; in particular, said harvesting head 2 is coupled with the agricultural machine 1 in a manner substantially perpendicular to the direction of travel (indicated by a dashed arrow associated with reference "S" in FIG. 1) of said agricultural machine 1.

Said harvesting head 2 comprises a mowing bar (designated as a whole by reference numeral 10 in the annexed drawings) for harvesting the crop. Also said mowing bar 10 is substantially perpendicular to the direction of travel S of the agricultural machine 1; in addition, the mowing bar 10 is adapted to move in a reciprocating straight motion and comprises at least one blade 11 or at least one blade portion 11 fitted with a plurality of teeth 12.

Preferably, the mowing bar 10 is so realized as to comprise a plurality of blades 11 or blade portions 11 aligned and coupled with one another in such a way as to form the mowing bar 10; it is however clear that the mowing bar 10 may be so realized as to comprise a single blade 11 extending along the entire front surface of the harvesting head 2.

Said at least one blade 11 slides on a fixed blade holder (indicated by reference numeral 13 in FIGS. 3 and 4) with normal teeth, at the ends of which divider elements are fitted (not shown in the annexed drawings), the function of which is to delimit the cutting width and to convey the crop or product towards the harvesting apparatus of the agricultural machine 1.

The agricultural machine 1 may be equipped with a reel (not shown), in particular of the raisable type, associated with said harvesting head 2 in order to accompany and/or lift from the ground and/or convey the product or crop towards the mowing bar 10 of the harvesting head 2.

The harvesting head 2 comprises also a transportation system (designated as a whole by reference numeral 20 in the annexed drawings) for transporting the cut (or harvested) crop from the mowing bar 10 towards a collection mouth 2A of said harvesting head 2.

It should be noted that said at least one transportation system 20 is positioned substantially parallel to the mowing bar 10, downstream of the mowing bar 10 with reference to the direction of travel S of the agricultural machine 1.

In particular, the transportation system 20 is positioned between the mowing bar 10 and the tractor (indicated by reference "M" in FIG. 1) of the agricultural machine 1.

In the embodiment shown in FIG. 1, the harvesting head 2 of the agricultural machine 1 is so realized as to comprise a transportation system 20 on each side of the harvesting head 2; it must be pointed out that, in such an embodiment, the collection mouth 2A is substantially located in a central portion of said harvesting head 2.

It is however clear that the harvesting head 2 of the agricultural machine 1 according to the present invention may also be realized to comprise a greater number of transportation systems 20; for example, in the case wherein the harvesting head 2 is divided into multiple portions, each transportation system 20 may be associated with one portion of the harvesting head 2. As a further example, said at least one transportation system 20 may comprise two or more overlapped transportation systems 20. As an alternative, the harvesting head 2 may be so realized as to comprise a single transportation system 20; this is possible, for example, when the harvesting head 2 comprises a collection mouth 2A located in proximity to one end of the harvesting head 2.

Moreover, in the embodiment shown in FIG. 1 the harvesting head 2 of the agricultural machine 1 is so realized as to comprise at least one pushing element 14 associated with a respective transportation system 20 for pushing and facilitating the entry of the material coming from said transportation system 20 into the collection mouth 2A. For example, said at least one pushing element 14 may consist of a feed screw mounted on the harvesting head 2 perpendicular to the direction of travel, said feed screw being preferably equipped with spirals (not shown in FIG. 1) suitably oriented for facilitating the entry of the material into the collection mouth 2A via a rotary motion in one direction.

Figure 2:
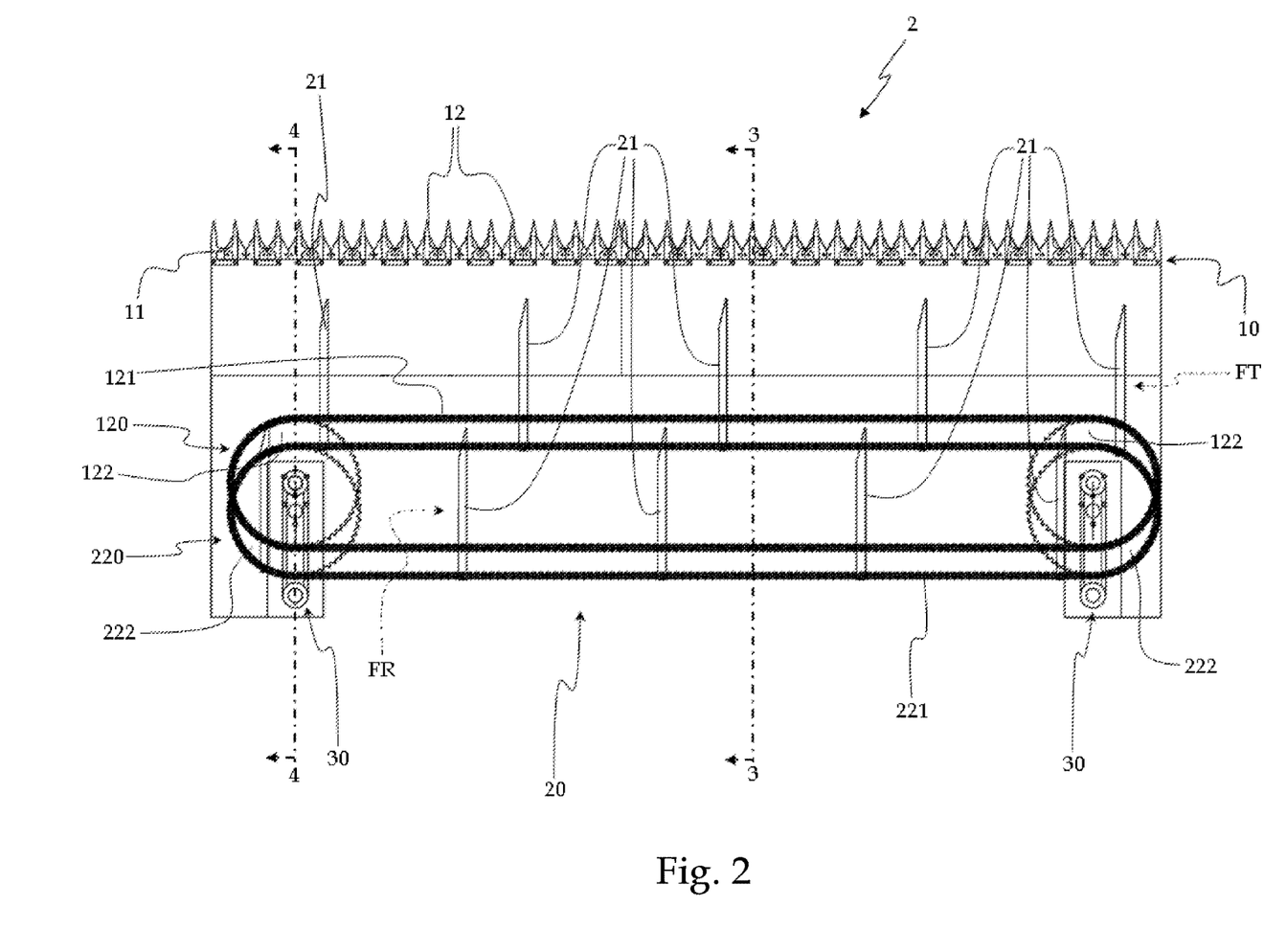
FIG. 2 is a top view of a portion of a harvesting head of the agricultural machine of FIG. 1.
Figure 3:
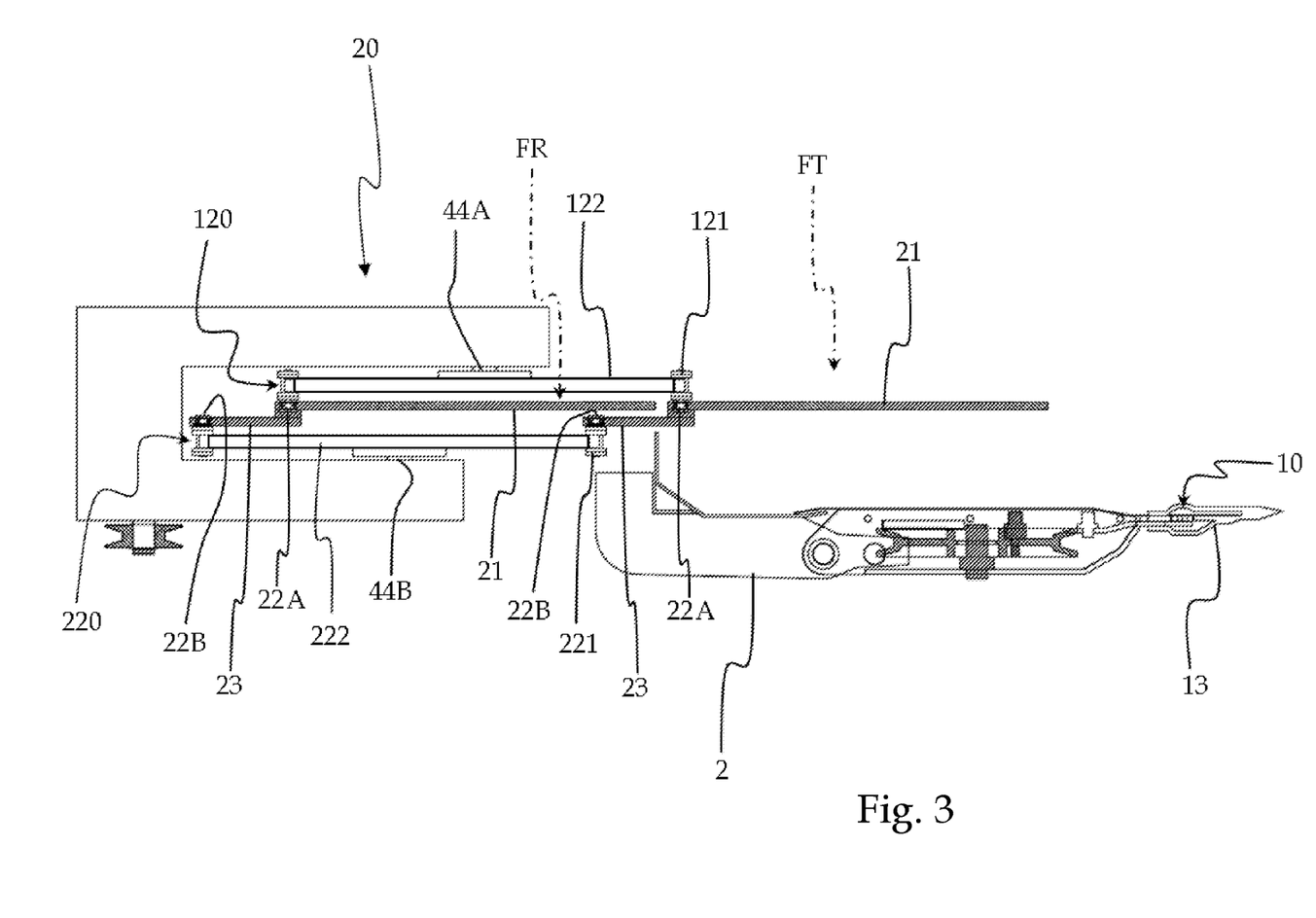
FIG. 3 is a sectional view along line 3-3 of FIG. 2.

In accordance with the present invention, and as shown in particular in FIGS. 2 and 3, said at least one transportation system 20 comprises:
a first transmission system 120 comprising a first flexible element 121 coupled with a pair of first rotary elements 122,
a second transmission system 220 comprising a second flexible element 221 coupled with a pair of second rotary elements 222,
at least one arm or fork 21 coupled with both of said first flexible element 121 and said second flexible element 221, in such a way as to extend on the harvesting head 2 substantially transversally relative to the mowing bar 10 both during a transportation step for transporting the crop cut by said mowing bar 10 and during a return step.

In FIGS. 2 and 3, said transportation step is indicated by a dashed-dotted arrow FT, whereas said return step is indicated by a dashed-dotted arrow FR.

In accordance with the present invention, said at least one arm 21 comprises a plurality of arms or forks 21, each arm 21 of said plurality of arms or forks 21 being coupled with both said first flexible element 121 and said second flexible element 221, in such a way to be substantially parallel to the other arms 21.

In an embodiment not shown in the annexed drawings, each arm 21 overlaps at least one other arm 21; as a result, in this embodiment two or more arms 21 are coupled together in an overlapped fashion, and are then coupled with both the first flexible element 121 and the second flexible element 221, e.g., by means of a bracket that joins them.

In an operating condition of the agricultural machine 1 (i.e., a condition in which the mowing bar 10 is positioned in such a way as to cut the crop), the transportation system 20 and/or each arm 21 of said transportation system 20 are substantially horizontal, i.e., substantially parallel to the ground whereon the crop is being harvested; it is however clear that the transportation system 20 and/or each arm 21 may alternatively be so positioned as to stay inclined.

In the embodiment shown in the annexed drawings, said first flexible element 121 and second flexible element 221 consist of a linked chain, while the pair of first rotary elements 122 and the pair of second rotary elements 222 consist of respective pairs of toothed wheels. It is however clear that such components may consist of different elements; for example, the first flexible element 121 and/or the secondo flexible element 221 may consist of belts (not shown), in particular toothed belts, or other similar elements. In this embodiment, the first rotary elements 122 and the secondo rotary elements 222 may consist of pulleys (also not shown), or other similar elements.

The transportation system 20 according to the present invention comprises coupling means 22A, 22B, 23 for coupling each arm 21 with both of said first flexible element 121 and said second flexible element 221.

In a preferred embodiment, said coupling means comprise:
a first joint element 22A coupled with the first flexible element 121;
a second joint element 22B coupled with the second flexible element 221;
a plate 23 connecting the first joint element 22A and the second joint element 22B, in particular each arm 21 being coupled with said plate 23 and/or with at least said first joint element 22A.

It should be noted that, in the embodiment shown in FIG. 3, the first joint element 22A is positioned on one end of the arm 21 (in particular, the end opposite to that which comes in contact with the cut crop to be transported), whereas the second joint element 22B is positioned on the plate 23; it is however clear that said first joint element 22A and second joint element 22B may also be positioned otherwise, e.g., on different ends of the plate 23.

It is also clear that the coupling means 22A, 22B, 23 shown in the annexed drawings may consist of other technically equivalent elements. For example, the plate 23 may be a separate part or may be made as one piece with the arm 21; moreover, in both embodiments (i.e., when it is a separate piece and when it is made as one piece with the arm 21) the plate 23 may be so realized as to have a substantially straight shape, or it may be so realized as to have a profiled shape.

It is therefore clear that the coupling means 22A, 22B, 23 may also be realized otherwise than shown in the annexed drawings, while however still allowing each arm 21 to be coupled with the first flexible element 121 and the second flexible element 221.

Since the transportation system 20 is realized in a manner such that said at least one arm 21 is coupled with both the first flexible element 121 of the first transmission system 120 and the second flexible element 221 of the second transmission system 220, it is clear that the provisions of the present invention allow the so-called arms or forks 21 to remain always positioned substantially horizontal (in an operating condition of the agricultural machine 1) and at an angle of 90° to a longitudinal axis of the mowing bar 10, both in the product transportation step FT (during which each arm 21 covers a section that can be defined as "active" or "ride" section) and in a return step FR (during which each arm 21 covers a section that can be defined as "passive" or "return" section, and said arm 21 runs along a path opposite to that of the transportation phase), and in proximity to the first rotary elements 122 and second rotary elements 222 (during which each arm 21 covers a transition section between the "active" section and the "passive" section, and vice versa).

As a result, each arm 21 of said plurality of arms 21 will always be positioned substantially parallel to the other arms 21 during the entire travel or path (i.e., in both of said transportation step FT and said return step FR, and in proximity of the first rotary elements 122 and second rotary elements 222).

It is therefore clear that said arms or forks 21 can be quickly inserted into and removed from the region where the crop cut by the mowing bar 10 is transported; since the arms 21 are quickly inserted into and removed from the product, they allow the creation of a continuous flow of crop or product without causing any shaking, overflowing or twisting during their insertion into and removal from said transportation region and said product.

Furthermore, the provisions of the present invention allow providing an agricultural machine 1, and an associated crop transportation system 20 for a harvesting head 2 of said agricultural machine 1, wherein said transportation system 20 is so realized as to harvest the crop in an effective and quick manner, without damaging the crop.

In a preferred embodiment, the first rotary elements 122 and the second rotary elements 222 are so realized as to have substantially the same dimensions, in particular in terms of circumference and diameter.

In addition, said first rotary elements 122 and second rotary elements 222 are so realized as to have a diameter which is proportional to the length of each arm 21; in particular, as can be seen in FIG. 3, the first rotary elements 122 and second rotary elements 222 have a diameter which is slightly greater than the length of each arm 21.

Furthermore, said arms 21 are coupled with the first flexible element 121 and the second flexible element 221 at a predefined distance, in particular said predefined distance not being shorter than approximately half the circumference of the first rotary elements 122 and/or second rotary elements 222.

According to the teachings of the present invention, the first transmission system 120 and the second transmission system 220 are at least partially overlapped; it is clear that such an overlapped condition can be particularly appreciated in a top view and in an operating condition of the agricultural machine 1 (i.e., a condition in which the mowing bar 10 is positioned for harvesting the crop, like the one shown in the annexed drawings).

In particular, the first rotary elements 122 are coupled with first shafts 44A located on the side opposite to the second rotary elements 222, and said second rotary elements 222 are coupled with second shafts 44B located on the side opposite to the first rotary elements 122; because of this provision, the first rotary elements 122 and the second rotary elements 222 can be supported on just one side, thus leaving a gap (designated by reference SL in FIG. 4) between said first rotary elements 122 and second rotary elements 222 for the passage of each arm 21 during the return step FR (i.e., in the "passive" or "return" section, wherein said arm 21 runs along a path in the direction opposite to that of the transportation step FT).

As can be seen in the annexed drawings, the first transmission system 120 and the second transmission system 220 are offset in their longitudinal development, in particular the first transmission system 120 being positioned on the harvesting head 2 in such a way as to be closer (in a top view) to the mowing bar 10 than the second transmission system 220. In addition to allowing the arms 21 to remain at an angle of 90° to a longitudinal axis of the transportation system 20 in both the transportation step FT and return step FR, this provision also allows increasing the power exerted on the lever system; in fact, when increasing or decreasing the offset between the first transmission system 120 and the second transmission system 220, it will also be necessary to increase or decrease the dimensions of the bracket 23, resulting in more or less power applied to the transportation system.

It is thus clear that the peculiar features of the present invention allow providing an agricultural machine 1 which is so realized as to comprise a crop transportation system 20 having a minimal height and therefore allowing the harvesting head 2 to be easily folded.

Such features turn out to be especially advantageous whenever said harvesting head 2 needs to be transported on the road, also considering that the minimal outer dimensions of the transportation system 20 will not obstruct the view of the operator of the agricultural machine 1 during road transportation. Moreover, the peculiar features of the transportation system 20 according to the present invention will also give minimal outer dimensions of the harvesting head 2 in the totally closed or folded condition, while at the same time allowing said harvesting head 2 to reach considerable working dimensions in the fully open or unfolded condition.

Due to the provisions of the present invention, the transportation system 20 can be so realized as to have limited width or depth dimensions.

The transportation system 20 according to the present invention may be so realized as to comprise translating means (designated as a whole by reference numeral 30 in FIG. 2), through which the offset between the first transmission system 120 and the second transmission system 220 can be changed (i.e., increased or decreased, or even set to zero); for example, said translating means 30 may be coupled with at least one first shaft 44A of the first rotary elements 122 and/or at least one second shaft 44B of the second rotary elements 222 for changing the positions of the same.

The provision of the translating means 30 allows setting the offset between the first transmission system 120 and the second transmission system 220 correctly according to the type of crop or product to be harvested, the effort that needs to be overcome for transporting the crop, the length of the arms 21, etc. It should be noted that the longer the offset distance, the greater the stability of the arms 21 and also the outer dimensions of the transportation system 20.

It must be pointed out that the transportation system 20 is preferably equipped with tensioning means (not shown in the drawings) ensuring proper tension of the first flexible element 121 and second flexible element 221.

Figure 4:
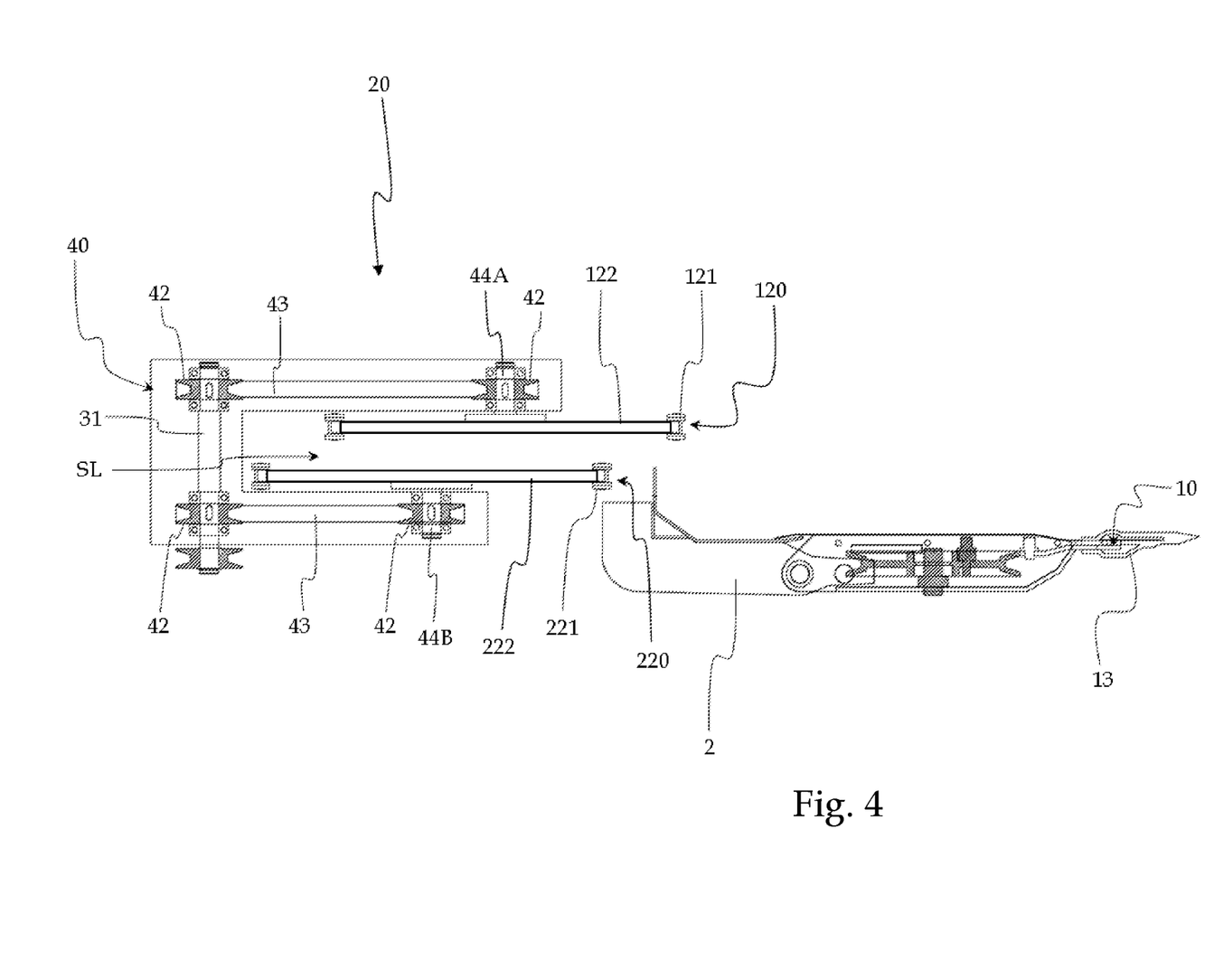
FIG. 4 is a sectional view along line 4-4 of FIG. 2.

In accordance with the present invention, the transportation system 20 comprises driving means (designated as a whole by reference numeral 40 in FIG. 4) that allow driving and turning at least one of said first rotary elements 122 and/or second rotary elements 222. By way of example, and as shown in FIG. 4, said driving means 40 may comprise a rotary shaft 41 coupled with a system of pulleys 42 and belts 43 (or other equivalent items) that allow turning at least one first shaft 44A coupled with each one of said first rotary elements 122 and/or at least one second shaft 44B coupled with each one of said second rotary elements 222; it is however clear that the driving means 40 may also be realized otherwise, e.g., through chains (not shown) replacing the belts 33 and pinions (not shown) replacing the pulleys 42, or by means of gears, bevel gear pairs, and so on.

Preferably, the driving means 40 according to the present invention are so conceived as to turn each one of the first shafts 44A of the first rotary elements 122 and each one of the second shafts 44B of the second rotary elements 222.

It must be pointed out that the driving means 40 according to the present invention are so conceived that the first flexible element 121 and the second flexible element 221 are turned in a synchronized manner via said first rotary elements 122 and second rotary elements 222; in particular, the driving means 40 allow turning in a synchronized manner at least one first shaft 44A coupled with at least one of said first rotary elements 122 and at least one second shaft 44B coupled with at least one of said second rotary elements 222.

This contributes significantly to create that parallelism of the arms 21 which is a peculiar and fundamental feature of the present invention, while also allowing each arm to be inserted into and removed from the product to be transported in a very fast manner and, most importantly, with constant parallelism between an arm 21 already inserted in the product and an arm 21 to be inserted and, vice versa, between an arm 21 already removed from the product and an arm 21 to be removed when the product has arrived.

The transportation system 20 according to the present invention may be so realized as to comprise a system of clutches (not shown in the annexed drawings) calibrated for a predefined load; in addition, the transportation system 20 according to the present invention may be realized in a manner such that the arms 21 are made of materials (such as aluminium, plastic, etc.) resistant to a predetermined breaking load. Such provisions will prevent the components of the transportation system 20 from failing should the load exceed a given threshold.

Furthermore, the transportation system 20 according to the present invention may be so realized as to comprise at least one guide (not shown in the annexed drawings) coupled with the first flexible element 121 and/or with the second flexible element 221 to facilitate the sliding action thereof; this provision will prevent the first flexible element 121 and/or the second flexible element 221 from being subjected to vibration, twisting, bending and other similar phenomena that might impair the proper circulation of the arms 21.

The features of the present invention, as well as the advantages thereof, are apparent from the above description.

In particular, the peculiar provisions of the transportation system 20 according to the present invention allow providing an agricultural machine 1 which is so realized as to include arms or forks 21 so arranged as to remain always parallel to one another at an angle of substantially 90° to a longitudinal axis of the mowing bar 10 through their entire travel or path (i.e., in both the product transportation step FT and the return step FR, as well as in proximity to the rotary elements 122, 222).

It is therefore clear that said arms or forks 21 can be quickly inserted into and removed from the region where the crop cut by the mowing bar 10 is transported, so as to create a continuous flow of product without causing any shaking, overflowing or twisting during their insertion into and removal from said transportation region.

As a result, the agricultural machine 1 and the associated transportation system 20 according to the present invention are so realized as to harvest the cut crop in an effective and quick manner, without damaging the crop.

Another advantage of the transportation system 20 according to the present invention is that it is so realized as to have minimal height dimensions, thus allowing the harvesting head 2 to be easily folded; as a result, these features turn out to be particularly advantageous in situations wherein said harvesting head 2 needs to be transported on the road, also considering the fact that the minimal outer dimensions of the transportation system 20 will not obstruct the view of the operator of the agricultural machine 1 during said road transportation.

In addition, the transportation system 20 according to the present invention is also so realized as to allow the harvesting head 2 to reach considerable working dimensions in the fully open or unfolded condition of said harvesting head 2.

It should also be noted that the possibility of adjusting the offset between the first transmission system 120 and the second transmission system 220 in their longitudinal development will allow increasing the power applied to the level system; when the offset between the first transmission system 120 and the second transmission system 220 is changed, it will also be necessary to increase or decrease the dimensions of the bracket 23, resulting in more or less power applied to the transportation system.

The agricultural machine and associated transportation system described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described agricultural machine and the associated transportation system, but may be subject to many modifications, improvements or replacements of equivalent parts and elements without departing from the inventive idea, as clearly specified in the following claims.

The invention claimed is:

1. An agricultural machine for harvesting a crop, equipped with a harvesting head comprising:
   a mowing bar for harvesting said crop;
   at least one transportation system adapted to transport the crop cut by the mowing bar to a collection mouth of the harvesting head, wherein said at least one transportation system comprises:
   a first transmission system comprising a first flexible element coupled with a pair of first rotary elements;
   a second transmission system comprising a second flexible element coupled with a pair of second rotary elements;
   a plurality of arms, each of the plurality of arms coupled with both of said first flexible element and said second flexible element, in such a way that the plurality of arms are substantially parallel and extend on the harvesting head substantially transversally relative to the mowing bar both during a transportation step for transporting the crop cut by said mowing bar and during a return step.

2. The agricultural machine according to claim 1, wherein the transportation system comprises coupling means for coupling each arm with both of said first flexible element and said second flexible element.

3. The agricultural machine according to claim 2, wherein said coupling means comprise:
   a first joint element coupled with the first flexible element;
   a second joint element coupled with the second flexible element;
   a plate connecting the first joint element and the second joint element, in particular each arm being coupled with said plate or with at least said first joint element.

4. The agricultural machine according to claim 3, wherein the first joint element is positioned on one end of the arm, while the second joint element is positioned on the plate.

5. The agricultural machine according to claim 1, wherein the first rotary elements and the second rotary elements are so realized as to have substantially the same dimensions in terms of circumference and diameter, in particular said first rotary elements and second rotary elements being so realized as to have a diameter which is slightly greater than the length of each arm.

6. The agricultural machine according to claim 1, wherein said arms are coupled with the first flexible element and with the second flexible element at a predefined distance, in particular said predefined distance not being shorter than approximately half the circumference of the first rotary elements or second rotary elements.

7. The agricultural machine according to claim 1, wherein the first transmission system and the second transmission system are at least partially overlapped, wherein the first rotary elements are coupled with first shafts located on the side opposite to the second rotary elements, and said second rotary elements are coupled with second shafts located on the side opposite to said first rotary elements.

8. The agricultural machine according to claim 7, wherein the first transmission system and the second transmission system are offset in their longitudinal development, in particular the first transmission system being positioned on the harvesting head in such a way as to be closer to the mowing bar than the second transmission system.

9. The agricultural machine according to claim 8, wherein the transportation system is so realized as to comprise translating means through which the offset between the first transmission system and the second transmission system can be changed.

10. The agricultural machine according to claim 1, wherein the transportation system comprises driving means that allow driving and turning at least one of said first rotary elements or second rotary elements.

11. The agricultural machine according to claim 1, wherein the transportation system is realized in a manner such that the arms are made of materials resistant to a predetermined breaking load to prevent the components of the transportation system from failing should the load exceed a given threshold.

12. A crop transportation system adapted to be coupled with a harvesting head of an agricultural machine according to claim 1.

13. The agricultural machine according to claim 2, wherein said coupling means comprise:
    a first joint element coupled with the first flexible element;
    a second joint element coupled with the second flexible element;
    a plate connecting the first joint element and the second joint element, in particular each arm being coupled with said plate and with at least said first joint element.

14. The agricultural machine according to claim 13, wherein the first joint element is positioned on one end of the arm, while the second joint element is positioned on the plate.

15. The agricultural machine according to claim 1, wherein said arms are coupled with the first flexible element and with the second flexible element at a predefined distance, in particular said predefined distance not being shorter than approximately half the circumference of the first rotary elements and second rotary elements.

16. The agricultural machine according to claim 1, wherein the transportation system comprises driving means that allow driving and turning at least one of said first rotary elements and second rotary elements.

17. An agricultural machine for harvesting a crop, equipped with a harvesting head comprising:
    a mowing bar for harvesting said crop;
    at least one transportation system adapted to transport the crop cut by the mowing bar to a collection mouth of the harvesting head, wherein said at least one transportation system comprises:
    a first transmission system comprising a first flexible element coupled with a pair of first rotary elements;
    a second transmission system comprising a second flexible element coupled with a pair of second rotary elements;
    at least one arm coupled with both of said first flexible element and said second flexible element, in such a way as to extend on the harvesting head substantially transversally relative to the mowing bar both during a transportation step for transporting the crop cut by said mowing bar and during a return step;
    wherein the first transmission system and the second transmission system are at least partially overlapped, wherein the first rotary elements are coupled with first shafts located on the side opposite to the second rotary elements, and said second rotary elements are coupled with second shafts located on the side opposite to said first rotary elements;
    wherein the first transmission system and the second transmission system are offset in their longitudinal development, in particular the first transmission system being positioned on the harvesting head in such a way as to be closer to the mowing bar than the second transmission system; and
    wherein the transportation system is so realized as to comprise translating means through which the offset between the first transmission system and the second transmission system can be changed.

* * * * *